Aug. 5, 1958   K. P. SHETTERLY ET AL   2,845,693
METHOD OF MANUFACTURE OF WELDED ELECTRICAL TERMINALS
Filed Dec. 11, 1953
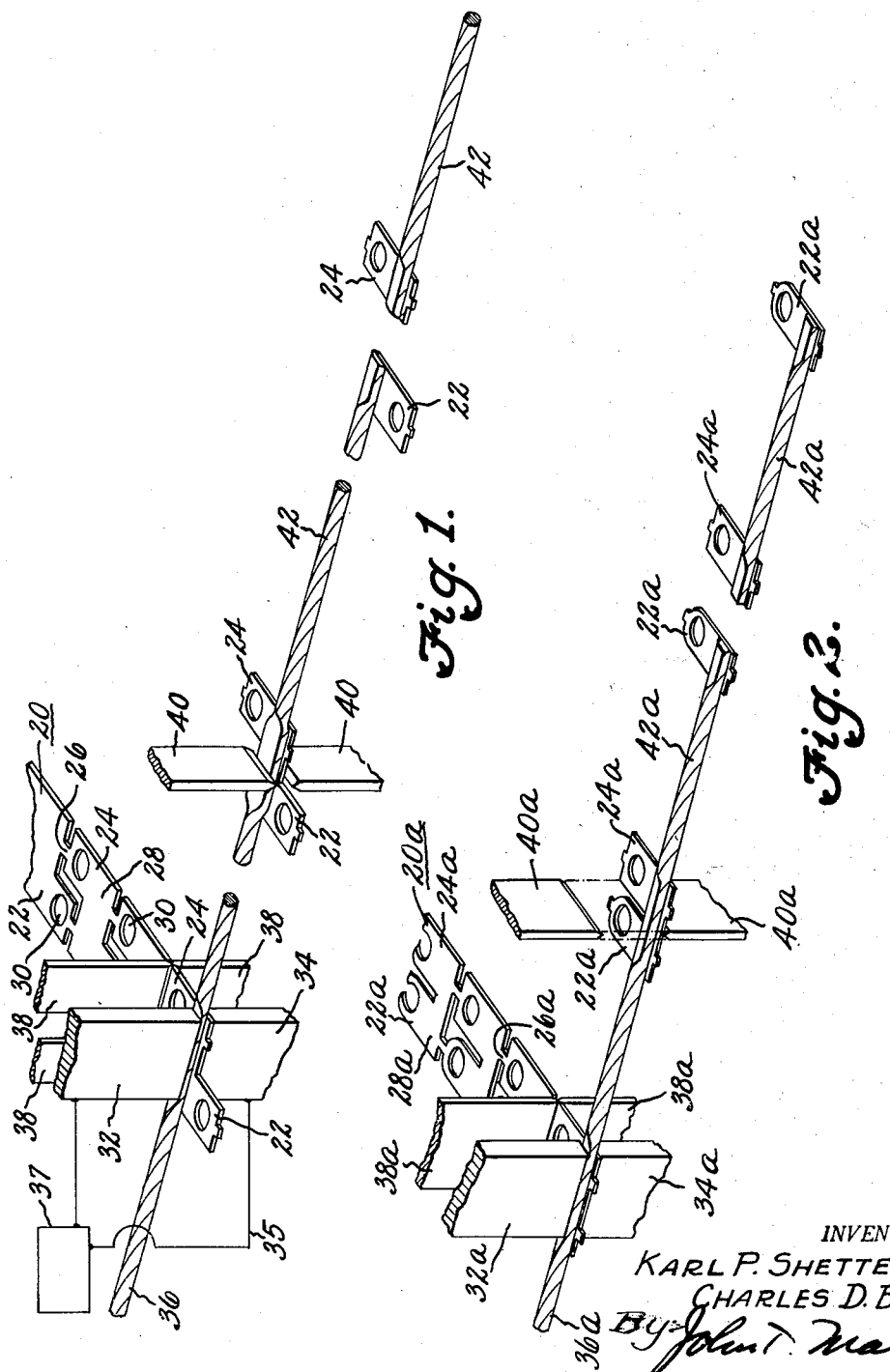
INVENTORS
KARL P. SHETTERLY
CHARLES D. BLAGG
By John T. Marvin
ATTORNEY

2,845,693

METHOD OF MANUFACTURE OF WELDED ELECTRICAL TERMINALS

Karl P. Shetterly and Charles D. Blagg, Anderson, Ind., assignors to General Motors Corporation, Detroit, Mich., a corporation of Delaware Application December 11, 1953, Serial No. 397,618

3 Claims. (Cl. 29—155.5)

This invention relates to an apparatus and method for joining clips to wire.

An object of the present invention is to provide a method for attaching clips to a wire which includes progressively moving a strip of clip material and a wire between separated parts of a pressure applying device that moves into engagement with and applies a pressure sufficient to join the clip portion and wire together so that the clip portion when severed from the strip of clip material will be attached to a length of the wire.

It is another object of the present invention to provide a method and apparatus for attaching a terminal clip to the ends of a conductor segment. This object is materialized by progressively moving a strip of clip material and a conductor wire between the spaced terminals of a resistance welder that intimately joins a clip and the wire together when the welder terminals are in pressure contact therewith so the clip when severed from the strip of clip material will be attached to the ends of a segment of conducting wire when the wire segment and the clip are simultaneously divided.

It is a further object of the present invention to provide a method and apparatus for automatically securing terminal clips to the ends of a length of wire conductor, this object is materialized by progressively moving a strip of skeletonized clip material that has the clip portions connected to each other in side-by-side relation and moving a conductor wire transversely to the direction of movement of said strip so that portions of both the clip strip and wire are located between spaced terminals of the resistance welder which supplies a sufficient welding heat and pressure for intimately joining a clip portion and wire together whereby the clip portion may be severed from said strip material and the clip portion may be divided while the wire segment is simultaneously divided from said wire to provide a clip on the end of a wire segment that is divided from the conductor.

Further objects and advantages of the present invention will be apparent from the following description reference being had to the accompanying drawings wherein a preferred embodiment of the present invention is clearly shown.

In the drawing:

Figure 1 diagrammatically in perspective shows the apparatus used with the method for attaching clips to a conductor wire wherein the clips are oppositely faced on a wire segment.

Figure 2 shows a modification of the device shown in Figure 1 wherein the clips face the same direction along the length of wire segment.

In the drawings the numeral 20 designates a strip of clip material that is preferably skeletonized by a suitable apparatus as a punch, not shown, so two terminal clips 22 and 24 are oppositely faced in side-by-side relation and have the apertured portions 30 thereof interconnected by reduced neck portions 26 of the strip material wherefrom the skeletonized clips 22 and 24 have been formed. The clips 22 and 24 also have the wire attaching portion thereof connected by connecting portion 28 that forms a portion of each of the clips 22 and 24 and is located between and remote from the holes 30.

The strip 20 is moved a predetermined distance by a suitable apparatus, not shown, between terminals 32 and 34 of a suitable pressure and heat applying means such as a resistance welder. Terminals 32 and 34 are energized through suitable conducting wires 35 from a power source diagrammatically shown and indicated as 37 on the drawings.

When the strip of skeletonized clip material 20 is moved between the terminals 32 and 34 of the resistance welder, it is positioned so that the terminals are in alignment with the portion 28 as located between the oppositely faced clips 22 and 24. Prior to the movement of the welding terminals 32 and 34 in contact with the clip portions 22 and 24, a length of conductor wire 36 is moved between the electrodes or terminals 32 and 34 of the resistance welder by a suitable apparatus, not shown, in a direction transverse to the direction of movement of strip 20, and is placed over the portion 28 between the clips 22 and 24 so that the welding action may be applied by the terminals 32 and 34 after they are axially moved into contact with the wire 36 and portion 28 to apply pressure therebetween and thereby intimately join the portion 28 to the wire 36.

After the clips 22 and 24 and wire 36 are joined together at portion 28, the clips are severed from the main body of the clip material 20 by the pair of suitably located cutting devices 38 which cut the portions 26 and thereby sever the clip portion from the main body of the skeletonized strip 20. After this severing is accomplished by cutting devices 38, the wire with the attached clips 22 and 24 is moved progressively over a predetermined distance in a direction transverse to the direction of movement of the strip of clip material 20; so a second pair of severing devices 40 may sever the portion 28 which connects the two clips and simultaneously sever the wire 36 so as to provide a clip 24 attached on one end of a wire segment 42 and an oppositely facing clip intimately joined to the end of the wire 36 which is located between the welding terminals. Thus it is clearly apparent as the step-by-step process is repeated a clip will be joined to each of the terminal ends of the wire segment 42 upon each successive operation.

In Figure 2 a modification of the present method and apparatus is shown wherein the skeletonized strip material 20a is formed so that the clips 22a and 24a face in the same direction and are joined with each other by a portion of the strip 28a and with the main body of the skeletonized strip by interconnection portions 26a. As clearly apparent from the foregoing description, the skeletonized strip 20a is progressively moved between welding terminals 32a and 34a so that the portion 28a is located therebetween and the conductor wire 36a is moved in a transverse direction of movement to strips 20a and located over portion 28a so that the welding terminals 32a and 34a may supply sufficient heat and pressure therebetween to intimately join the conductor wire 36a to the portion of the clip 28a as located on clips 22a and 24a. After the welding step has been accomplished the portions 26a are divided by a suitable cutting device indicated as 38a so that two clips 22a and 24a are located in side-by-side relation on a segment length of wire 42a after the conductor wire is moved from between the welding terminals 32a and 34a. The clips are then separated from each other by a suitable cutting device 40a which simultaneously divides the wire segment 40a from the main portion of the conductor 36a. As the process is repeated, it is apparent that the clips 22a and 24a are joined to and face in the same direction on ends of a length of wire segment 40a.

It is manifest that the wire segment 42 and segment 42a may be of any desired length and the wires 36 and 36a may be fed at any transverse angle to the clip material 20 and 20a through the machine and the shape of the clips may be other than is shown.

To further facilitate the intimate connection between the wire and clip material, it may be preferable to precoat the terminal clip material which is preferably of brass with tin, solder or other suitable material so as to achieve a better electrical connection. Further, if a stranded bare copper wire is utilized, the method which comprehends welding the clips and conductor together before cutting will prevent the fraying of the ends thereof and thus provide a better electrical and mechanical connection between the parts attached to one another.

Further the cutting operation of the clip portions and wire may be accomplished in a plurality of steps, as indicated, or may be accomplished simultaneously if suitable modifications are made to the heat and pressure applying means so one of the cutting devices may operate between the terminals.

While the embodiment of the present invention as herein disclosed, constitutes a preferred form, it is to be understood that other forms might be adopted.

What is claimed is as follows:

1. In a method for attaching terminal clips to a conductor, the steps comprising; progressively moving a predetermined length of preformed strip material having a pair of clip portions in side by side relation and joined by an intermediate section of strip material between the terminals of a resistance welder, progressively moving a predetermined length of an electrical conductor across said intermediate section of strip material in an axial direction transverse to the movement of said strip, moving said welder terminals into engagement with said conductor and intermediate section for forming an intimate area of attachment therebetween having a predetermined length, severing said clip portions and said intermediate section as a whole from said strip, and then simultaneously severing said intermediate section and its attached conductor at a point intermediate the length of the area of attachment of said conductor portion and said intermediate section, whereby said clip portions are divided from one another and are joined to the severed ends of said conductor.

2. In a method for attaching terminal clips to a conductor, the steps comprising; progressively moving a portion of predetermined length of a strip of skeletonized clip material between the terminals of a resistance welder, said portion including two clip segments disposed side by side and a clip joining section of strip material, progressively moving a predetermined segment of a length of conductor wire between said welder terminals in an axial direction transverse to the direction of movement of said strip, moving said welder terminals into pressure engagement with said wire and said portion for deforming the conductor segment in contact with said portion to thereby form an intimate deformed area of attachment therebetween of predetermined length, severing said portion from said strip, and then simultaneously severing said clip joining section and its attached conductor at a point intermediate the ends of the deformed area of attachment of said portion and conductor segment, whereby one of the clip segments is joined to a deformed end of the severed conductor segment and the other clip segment is joined to a deformed end of said conductor wire which forms the succeeding conductor segment when said segment is divided from said conductor length after a clip segment is attached to the other end thereof.

3. In a method for attaching terminal clips to the ends of a conductor segment, the steps comprising; progressively moving a portion of predetermined length of a strip of skeletonized clip material between the terminals of a resistance welder, said portion including two clip segments oppositely disposed in side by side relation and a clip joining section of strip material, progressively moving a predetermined segment of a length of conductor wire between said welder terminals and over said opposite disposed clip segments in an axial direction transverse to the direction of movement of said strip, moving said welder terminals into pressure engagement with said wire and said portion for deforming the conductor segment in contact with said portion to thereby form an intimate deformed area of attachment therebetween of predetermined length, severing said portion from said strip, and then simultaneously severing said clip joining section and its attached conductor at a point intermediate the ends of the deformed area of attachment of said portion and conductor, whereby one of said clip segments is joined to an end of a conductor segment and the other clip segment is joined in opposed relation to the first clip segment on the end of the conductor wire which forms the succeeding conductor segment when said segment is divided from said conductor length after the succeeding clip segment is attached to the other end thereof.

References Cited in the file of this patent

UNITED STATES PATENTS

| 1,836,500 | Poole | Dec. 15, 1931 |
| 1,959,150 | Basch | May 15, 1934 |
| 2,254,117 | Keller | Aug. 26, 1941 |
| 2,422,380 | Whitaker | June 17, 1947 |
| 2,592,276 | Hackbarth | Apr. 8, 1952 |
| 2,684,421 | Hipple | July 20, 1954 |
| 2,711,466 | Marx | June 21, 1955 |